May 28, 1929.  A. R. BUTTS  1,714,899
DRILL TOOL CONNECTION
Filed Sept. 14, 1927
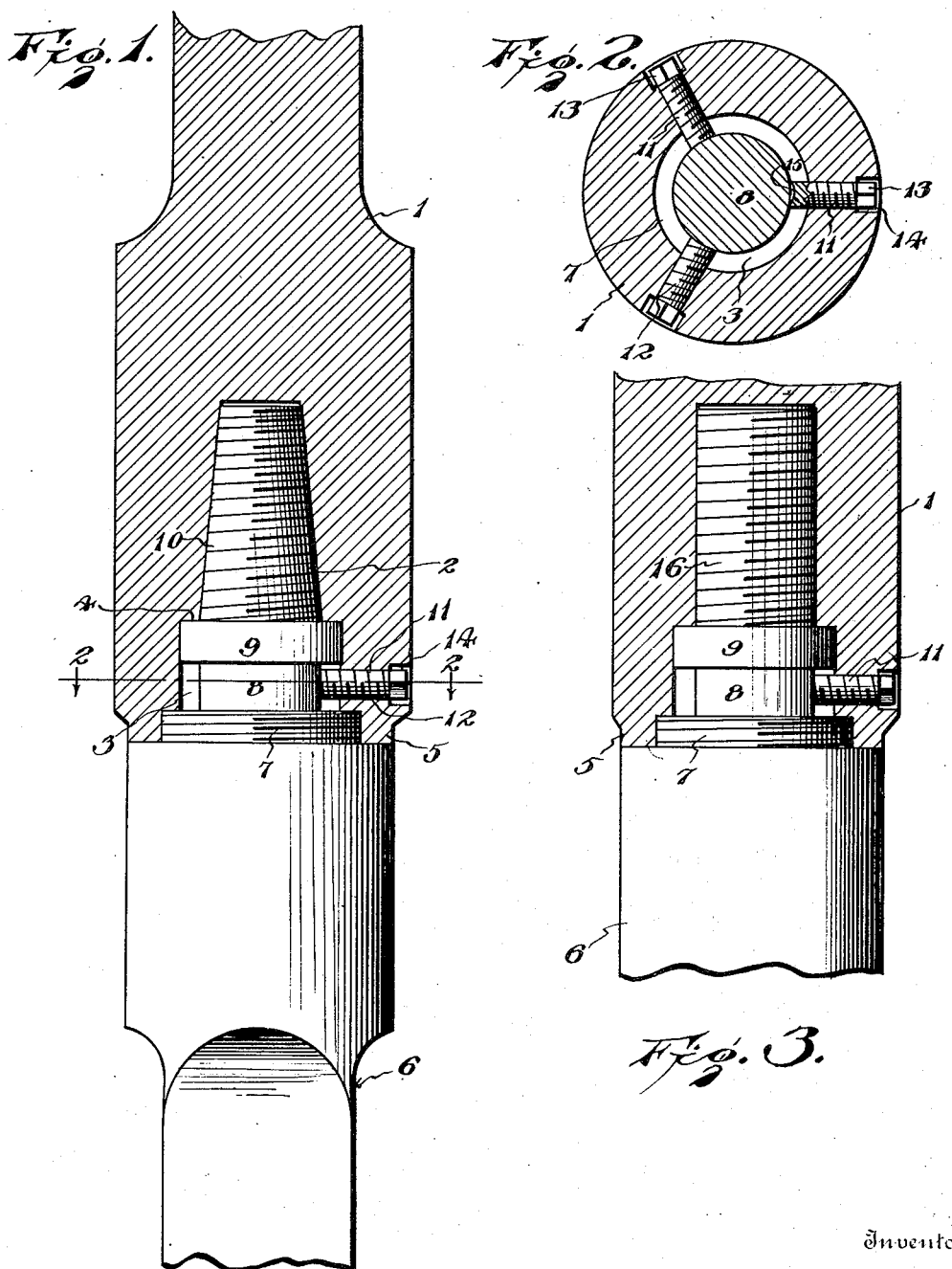
Inventor
A. R. Butts
By Lacey & Lacey, Attorneys Patented May 28, 1929.

1,714,899

UNITED STATES PATENT OFFICE.

ARCHIBALD R. BUTTS, OF EMMETT, KANSAS.

DRILL-TOOL CONNECTION.

Application filed September 14, 1927. Serial No. 219,508.

The present invention is directed to improvements in drill tool connections.

The primary object of the invention is to provide a device of this character so constructed that the drill tool can be so connected with the drill rod as to positively prevent accidental separation of the tool and rod.

Another object of the invention is to provide a device of this kind wherein an extremely simple connection is obtained, the construction being such that the parts can be easily and quickly separated when desired, but prevented from becoming accidentally disengaged during operation, thus preventing loss of the tool in the well.

In the accompanying drawing:

Figure 1 is a partial side elevation and sectional view showing the parts connected.

Figure 2 is a sectional view on line 2—2 of Figure 1.

Figure 3 is a partial side view and sectional view of a modified form of the invention.

Referring to the drawing, 1 designates a drill rod, the lower end of which has formed therein an axial tapered threaded socket 2 which opens into a recess 3, the base of which provides an annular shoulder 4, said recess being counterbored to provide an interiorly threaded rim 5, the purpose of which will be later explained.

The drill tool 6 has its upper end provided with a threaded enlargement 7 which has rising centrally therefrom a neck 8, the upper end of which is provided with a head 9, said head having carried thereby a threaded tapered shank 10 for threaded engagement within the socket 2.

As shown in Figure 1, the upper end of the head is engaged with the shoulder 4 when the shank 10 and enlargement 7 are in threaded engagement, respectively, with the socket 2 and rim 5.

The rod is provided with radial threaded openings 11 in which are engaged set screws 12, the heads 13 thereof being located in the recesses 14 in order that a tool may be engaged therewith. The inner ends of the set screws enter the recess 3 and are preferably concave, as at 15, so that they will more effectively bite into the neck 8 when screwed inwardly.

The modified form of invention, as shown in Figure 3, differs from the preferred form, in that the shank 16 thereof is of the same diameter throughout its length, and may be preferred in some instances.

It will be obvious that when the set screws are tightened that relative rotation of the rod and tool will be prevented, and further it will be noted that should the threaded connection strip, the set screws will be in such position as to engage the lower side of the head 9. In this manner separation of the tool and rod, even if the threads should strip is positively prevented.

Having thus described the invention, I claim:

A device of the class described, comprising a drill rod having a threaded axial socket, and a recess into which the socket opens, and providing a shoulder, an interiorly threaded rim upon the rod, a drill tool having a threaded enlargement for engagement with the rim, a neck carried by the enlargement and having a head carried thereby for engagement with the shoulder, a threaded shank carried by the head for engagement with the socket and set screws carried by the rod and having their inner ends extended into the recess for engagement with the neck.

In testimony whereof I affix my signature.

ARCHIBALD R. BUTTS. [L. S.]